US012057709B2

(12) United States Patent
Egenter et al.

(10) Patent No.: US 12,057,709 B2
(45) Date of Patent: Aug. 6, 2024

(54) METHOD FOR OPERATING A KI SYSTEM

(71) Applicant: E.G.O. Elektro-Geraetebau GmbH, Oberderdingen (DE)

(72) Inventors: Christian Egenter, Bretten (DE); Max-Felix Mueller, Oberderdingen (DE); Mathias Bellm, Ubstadt-Weiher (DE); Ulrich Waechter, Bruchsal (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 0 days.

(21) Appl. No.: 18/046,578

(22) Filed: Oct. 14, 2022

(65) Prior Publication Data

US 2023/0121821 A1   Apr. 20, 2023

(30) Foreign Application Priority Data

Oct. 19, 2021   (DE) ..................... 10 2021 211 806.2

(51) Int. Cl.
*H02J 50/10*   (2016.01)
*H02J 50/80*   (2016.01)

(52) U.S. Cl.
CPC .............. *H02J 50/10* (2016.02); *H02J 50/80* (2016.02); *H02J 2207/20* (2020.01)

(58) Field of Classification Search
CPC ........ H02J 50/10; H02J 50/80; H02J 2207/20; H02J 50/12
See application file for complete search history.

(56) References Cited

U.S. PATENT DOCUMENTS

| 10,962,574 B2 * | 3/2021 | Zhou ........................ H03H 7/06 |
| 2014/0152249 A1 * | 6/2014 | Yeh ......................... H02J 50/10 |
| | | 320/108 |

(Continued)

FOREIGN PATENT DOCUMENTS

| DE | 102019202991 A1 | 9/2020 |
| DE | 102019214047 A1 | 3/2021 |

(Continued)

OTHER PUBLICATIONS

European Patent Office, Extended European Search Report received for Application No. 22201302.1, dated Mar. 22, 2023, 10 pages, Germany.

(Continued)

*Primary Examiner* — Jared Fureman
*Assistant Examiner* — Michael J Warmflash
(74) *Attorney, Agent, or Firm* — Alston & Bird LLP

(57) ABSTRACT

A method for operating a system having a device for the wireless transmission of energy to an electrical consumer by means of inductive coupling, and an electrical consumer, wherein the device has: a rectifier for generating a DC voltage from a line voltage, an inverter which is fed from the DC voltage and designed to generate a pulse-width-modulated activation signal, a power coil activated by the pulse-width-modulated activation signal, by means of which an alternating magnetic field can be generated to transmit the energy, a communication device designed to exchange data bi-directionally with the electrical consumer, and a regulator designed to regulate a power output by the inverter to a predetermined setpoint, and wherein the electrical consumer has: a switching device for changing the load impedance of the electrical consumer, and a communication device designed to exchange data bi-directionally with the device, wherein the method comprises the steps: synchronizing the (Continued)

Figure 1:
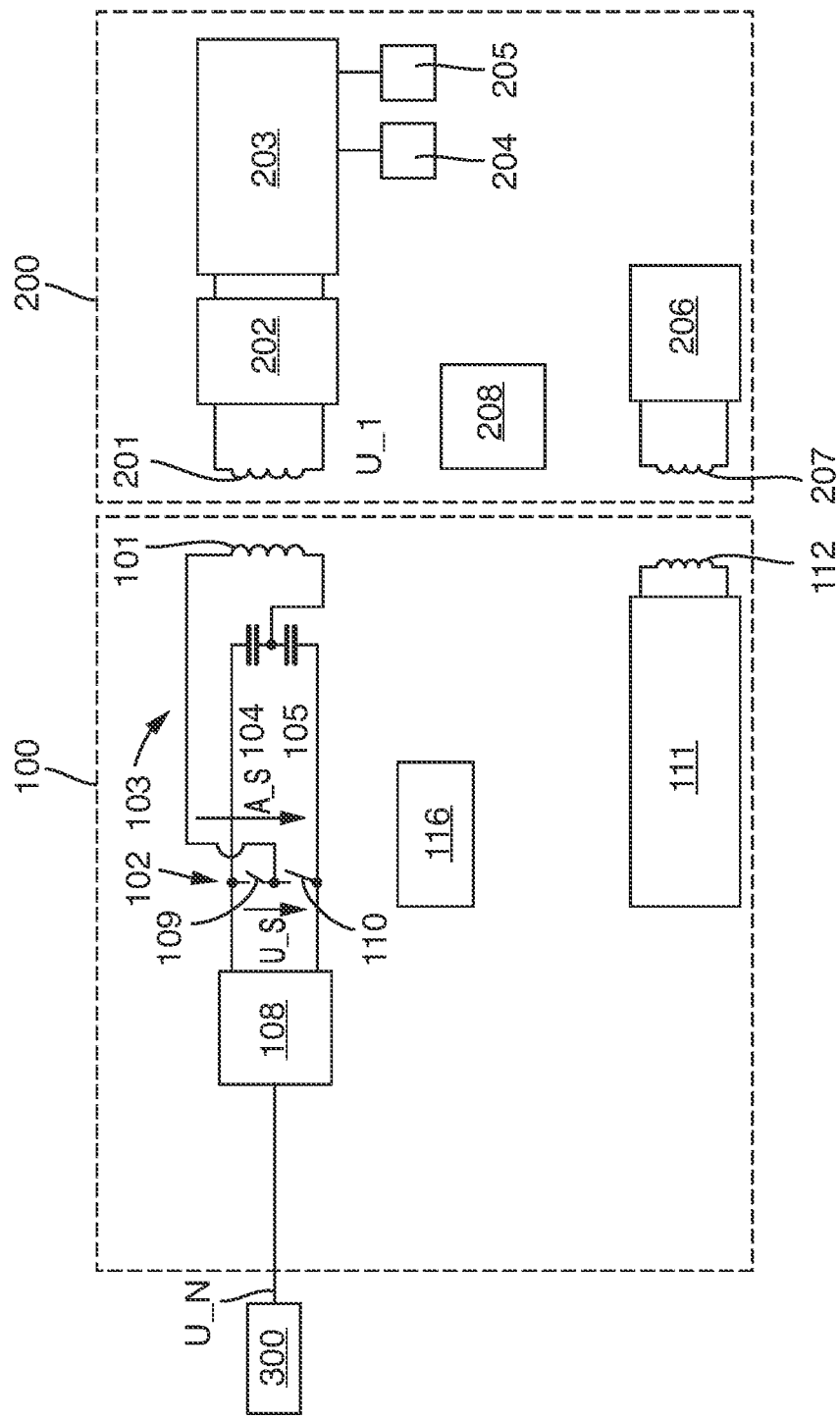

operation of the device and the operation of the electrical consumer in such a way that, during a change in the load impedance of the electrical consumer, a transition frequency and/or a transition duty cycle of the pulse-width-modulated activation signal is/are set in such a way that voltages and/or currents induced in the electrical consumer do not exceed and/or fall below specified threshold values.

9 Claims, 3 Drawing Sheets

(56) References Cited

U.S. PATENT DOCUMENTS

| | | | | |
|---|---|---|---|---|
| 2016/0118805 | A1* | 4/2016 | Swope | H02J 50/80 |
| | | | | 307/104 |
| 2018/0219418 | A1* | 8/2018 | Govindaraj | H02J 50/12 |
| 2020/0287421 | A1* | 9/2020 | Egenter | A47J 43/0465 |
| 2022/0376560 | A1* | 11/2022 | Gonda | H02J 50/12 |

FOREIGN PATENT DOCUMENTS

| | | | | |
|---|---|---|---|---|
| EP | 3790159 | A1 * | 3/2021 | H02J 50/12 |
| EP | 3790159 | A1 | 3/2021 | |

OTHER PUBLICATIONS

German Patent and Trademark Office, Office Action received for Application No. 102021211806.2, dated Aug. 24, 2022, 7 pages, Germany.

\* cited by examiner

METHOD FOR OPERATING A KI SYSTEM

CROSS-REFERENCE TO RELATED APPLICATIONS

This application claims priority to German Application No. 10 2021 211 806.2, filed Oct. 19, 2021, the contents of which are hereby incorporated herein in its entirety by reference.

The object of the invention is to provide a method for operating a system having a device for the wireless transmission of energy to an electrical consumer by means of inductive coupling, and having an electrical consumer and a corresponding system, which enable the most reliable operation of the system, in particular if the load impedance of the electrical consumer changes.

The method is used to operate a system having a device for the wireless transmission of energy to an electrical consumer by means of inductive coupling, also known as Wireless Power Transfer, WPT, and an electrical consumer. With regard to the fundamentals of WPT, reference is also made to the relevant technical literature. The system is preferably operated according to the WPC (Wireless Power Consortium) Ki (Cordless Kitchen) method. The device for the wireless transmission of energy to an electrical consumer by means of inductive coupling can also be called a transmitter and the electrical consumer can be called a receiver.

The device has a conventional single-phase or multi-phase rectifier for generating a DC voltage, in particular from a sinusoidal line voltage.

The device has an inverter supplied from the DC voltage. The inverter can be, for example, a half-bridge inverter or a full-bridge inverter. The inverter is designed to generate a pulse-width-modulated activation signal with adjustable frequency and/or duty cycle.

The device has a conventional power coil or transmitter coil controlled by the inverter and designed to generate an alternating magnetic field to transmit the energy. For this purpose, the inverter generates an activation signal, in particular a periodic activation signal, in particular in the form of an activation voltage, and the activation signal activates or is applied to the power coil or an oscillator circuit comprising the power coil. The activation signal typically has an operating point that is dependent on a power setpoint or that matches the power setpoint. An operating point here refers in particular to one or more properties of the activation signal, e.g. amplitude, duty cycle and/or frequency of the activation signal.

The device has a communication device designed to exchange data bi-directionally with the electrical consumer.

The device also has a regulator designed to regulate a power output from the inverter to a predetermined (power) setpoint. For example, a frequency and/or a duty cycle of the activation signal can be used as the manipulated variables of the regulator or regulation system.

The electrical consumer has a switching device for changing the load impedance of the electrical consumer. The load impedance of the electrical consumer can change very rapidly due to electrical loads on the electrical consumer that can be switched on/off. Such switchable electrical loads can be operated, for example, directly with an induced AC voltage and/or behind a rectifier.

The electrical consumer has a communication device designed to exchange data bi-directionally with the device.

According to the invention, the operation of the device and the operation of the electrical consumer are synchronized with each other in such a way that, before or during a change in the load impedance of the electrical consumer, a transition frequency and/or a transition duty cycle of the pulse-width-modulated activation signal is/are set in such a way that voltages and/or currents induced in the electrical consumer do not exceed and/or fall below specified threshold values.

In one embodiment the regulator is disabled while the load impedance of the electrical consumer is changed.

In one embodiment the transition frequency and/or the transition duty cycle is/are set in such a way that a voltage induced in the electrical consumer remains less than or equal to a nominal voltage of the electrical consumer, irrespective of the load impedance of the electrical consumer. For example, the nominal voltage can be 230 V or 110 V.

In one embodiment, the transition frequency is set to ≥40 kHz for coupling factors between the device and the electrical consumer of ≤0.45, and the transition frequency is set to ≤50 kHz for coupling factors between the device and the electrical consumer of ≥0.45 to 0.8. Optionally, the duty cycle can be reduced from, for example, 50% to lower values in order to induce a voltage lower than the rated voltage in every case, even in special cases. With regard to the definition of the coupling factors, reference should be made to the relevant technical literature.

Alternatively, the transition frequency is set to zero Hz, i.e. the inverter is temporarily disabled or switched off.

In one embodiment, the method comprises the following steps: a) transmitting data from the electrical consumer to the device, wherein the data indicate that the electrical consumer wants/plans to change its electrical load impedance, b) thereafter, transmitting data from the device to the electrical consumer, wherein the data indicates that the data from the electrical consumer has been received by the device, and disabling the regulator and adjusting the transition frequency and/or the transition duty cycle, c) thereafter, changing the load impedance of the electrical consumer and transmitting data from the electrical consumer to the device, wherein the data indicates that the electrical consumer has changed its load impedance, and d) thereafter, activating the regulator and regulating an electrical power output by the inverter to a stationary setpoint.

In one embodiment, the data transmitted from the electrical consumer to the device in step a) additionally includes a desired setpoint, wherein in step d) the stationary setpoint is set depending on the desired setpoint, in particular is equal to the desired setpoint.

In one embodiment, the data transmitted from the electrical consumer to the device in step a) contains additional information or a value that identifies the load impedance after the load change. This value describes, for example, the resistance or the load impedance, independently of the desired setpoint, for example as a receiver quality Q_PRx.

In one embodiment, data is transmitted between the electrical consumer and the device in a time range around a zero crossing of the line voltage.

The system according to the invention has a device described above and an electrical consumer described above, which are designed to carry out the method according to the invention.

In the following explanations, the device for the wireless transmission of energy to the electrical consumer by means of inductive coupling can also be called a transmitter and the electrical consumer can be called a receiver.

The invention is used in particular to supply energy to wireless receivers in the form of kitchen appliances conforming to the Ki standard. The invention enables a fast, synchronized switching of the load impedance in the receiver and the power in the transmitter with little impact on the induced load voltage in the receiver, while reliably avoiding overvoltages due to the respective confirmations from the opposite side. Normally, it is only necessary to interrupt or restrict the power supply for one half-wave of the line voltage.

The Ki specification is intended to support devices with multiple load elements, such as so-called Airfryers with one or two switchable heating resistors and a fan that is designed to circulate the air continuously while the Airfryer is in operation.

If the load impedance $$Z_{Last} = \frac{U\_Last}{I\_Last}$$

changes due to a load element being switched on or off, this affects the power transmission and the transmission function P(f) changes.

If the transmitter is working at an operating point with a frequency f_op_1 and with a duty cycle DC_op_1 matching a nominal power P_soll_1 with a load voltage U_Last_1r, then in very many cases the voltage induced in the receiver increases abruptly to higher or critical voltage values when the load impedance is increased by switching off a partial load impedance. Voltage increases in the receiver are particularly critical, especially if the overvoltage is very high and flashovers occur. On the other hand, when the load impedance is reduced by switching on a partial load impedance, the voltage induced in the receiver collapses.

The load impedance of a receiver can also change randomly or in unplanned ways, for example in the case of a motor if the required torque changes, for example as a result of cutting up food items. These changes in the load impedance are not an object of the invention, because the receiver cannot in principle know when and in what manner such a change occurs. However, these changes typically occur slowly and are therefore less critical than the abrupt switching of the load impedance.

When planned switching of different loads in the receiver occurs, the receiver can inform the transmitter in advance about the imminent change in the load impedance. The change in the load impedance can have relevant effects on the operating point of the power transmission in the transmitter.

If, for example, one of the loads is a motor, the speed of which is normally perceived by the user acoustically, efforts are made to ensure that the voltage on the load(s) connected in parallel changes as little as possible during switching.

Inducing an overvoltage in the receiver should be avoided at all costs, as possible flashovers can also pose a safety risk.

Due to the prior announcement according to the invention of the load change or change in the load impedance in a predetermined number of line half-waves of the line voltage, for example in the fourth line half-wave after an announced data transmission, the transmitter can keep its old power setpoint constant until the line half-wave when the load impedance is switched by the receiver. In the line half-wave with the announced switching operation, for example, the regulation in the transmitter is interrupted and the operating frequency of the activation signal is switched to a high frequency and/or the duty cycle of the activation signal is switched to a low value, and/or the power supply is interrupted.

For example, when the load change is pre-announced, the receiver sends a characteristic value that indicates its future load, for example Q_PRx, and the future power setpoint for the transmitter regulator. The transmitter will confirm that it has received the announcement in the next or one of the next data transmission time intervals, and that it will interrupt the regulation in a predetermined subsequent power transfer time interval. With the confirmation by the transmitter, the receiver can now prepare its load change. If low-cost relays are used in the receiver for switching the load, the actuation and release delays as well as their tolerances must be allowed for, which is why the switching should preferably take place in the next but one power transfer time interval for 50 or 60 Hz operation. The receiver must not carry out the load change without confirmation from the transmitter. After successfully switching its load, the receiver confirms the implementation of the switch to the transmitter. After confirming the switching of the load, the transmitter can regulate to the new setpoint.

The receiver quality Q_PRx, together with the resonance frequency of the receiver, sufficiently characterizes the effective load impedance R_L for the power transmission from the point of view of the transmitter:

$$Q_{PRx} = \frac{2 * \pi * f_s * L\_s}{R\_L}$$

with receiver resonance frequency $f_s$, receiver inductance L_s and load resistance or load impedance R_L.

An essential feature of the invention is the synchronized switching of a load (impedance) in the receiver, which allows the transfer function and thus the operating point to change in a relevant way, with the adjustment of the regulation in the transmitter, wherein the sudden load change is announced by the receiver. The sudden load change can be carried out several, for example 4, line half-waves after the announcement. The transmitter can confirm the load change in a data transmission time interval, for example the next one, i.e. 2 line half-waves after the announcement. After receiving the transmitter confirmation, the receiver can switch a load on or off, preferably in the next but one line half-wave. The receiver can then confirm the successful switching, preferably in the next line half-wave, so that the transmitter can continue its regulation with the new operating point.

Up to the line half-wave directly before the load change, the transmitter operates with the setpoints of the first load, in the switchover line half-wave or until the confirmation from the receiver it operates with a predefined, non-critical operating point without regulation, for example at an operating point with high operating frequency and/or low duty cycle or interrupted power transmission, before the power transmission can be resumed with a regulation to the setpoint with adjusted regulation parameters after confirmation of the successful switching of the load.

Figure 2:
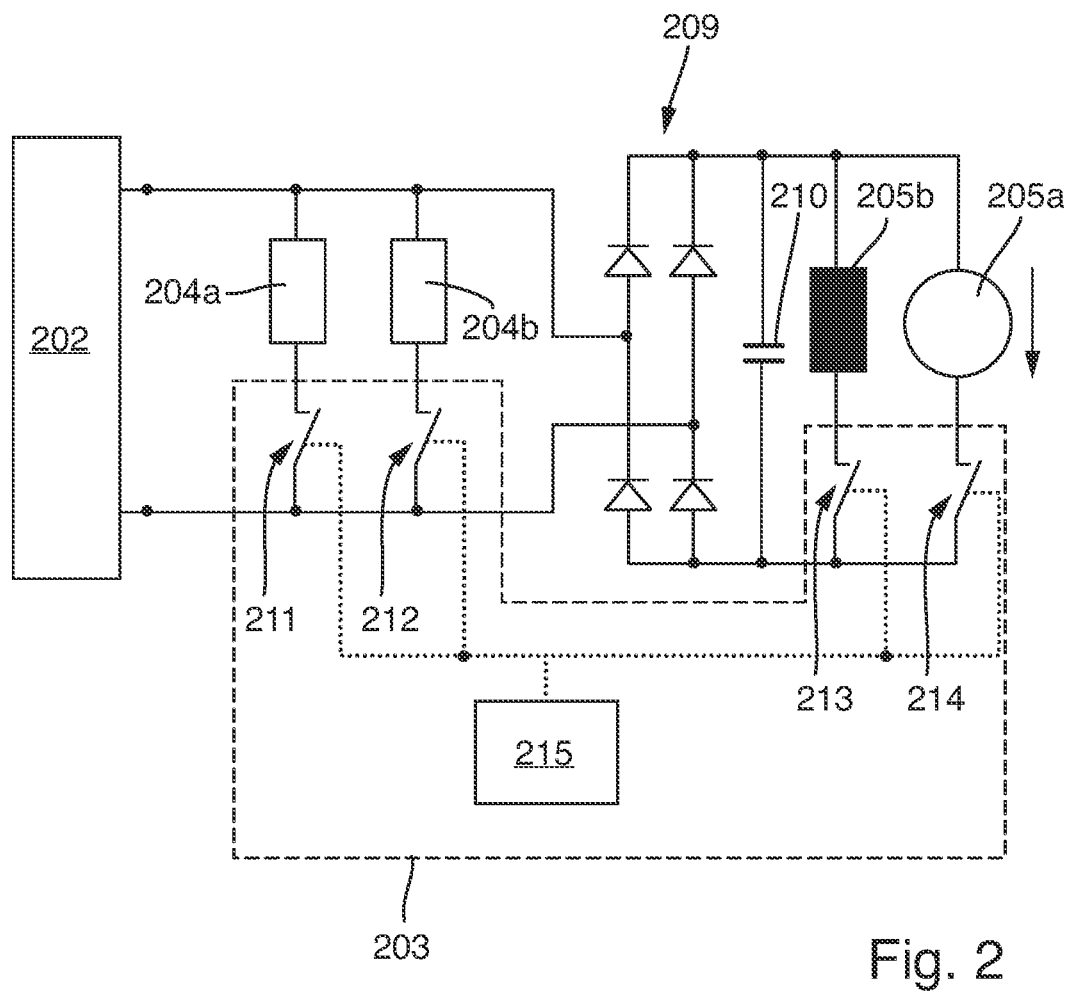
Figure 3:
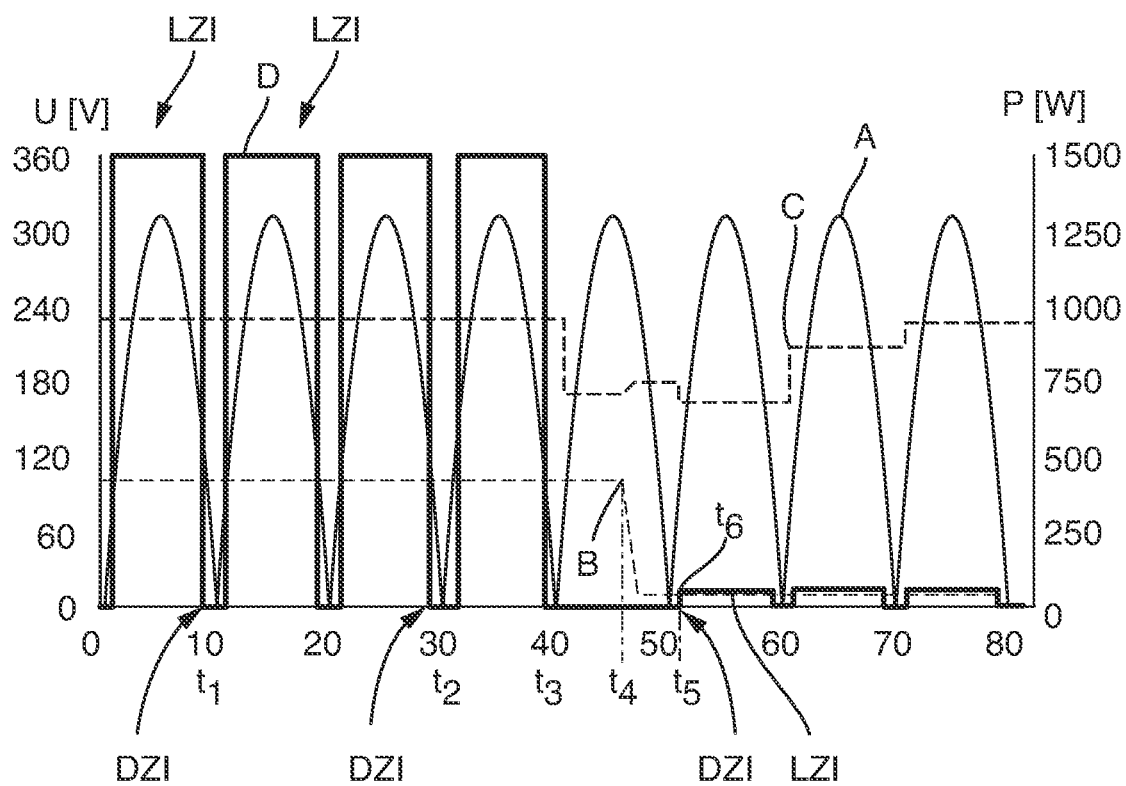

The invention is described in detail in the following with reference to the drawings. In the drawings:

FIG. 1 shows a block circuit diagram of a system having a device for wireless transmission of energy and an associated electrical consumer, FIG. 2 shows a highly schematic circuit diagram of a switching device for changing a load impedance of the electrical consumer shown in FIG. 1, and FIG. 3 shows a temporal sequence of the method according to the invention.

FIG. 1 shows a block circuit diagram of a system having a device 100 for wireless transmission of energy to an electrical consumer 200 by means of inductive coupling, and an electrical consumer 200 supplied by means of the device 100.

The device 100 has a rectifier 108 for generating a DC voltage U_S from a conventional single-phase line voltage U_N of an AC voltage network 300.

The device 100 also has an inverter 102 with switching means 109 and 110, which is fed from the DC voltage U_S and designed to generate a pulse-width-modulated activation signal A_S.

The device 100 also has capacitors 104, 105, which are looped in series between output terminals of the rectifier 108 or the supply voltage U_S.

The device 100 also has a power coil 101 activated by means of the pulse-width modulated activation signal A_S, wherein the capacitors 104, 105 and the power coil 101 are interconnected in such a way that they form an oscillator circuit 103. For this purpose, one terminal of the power coil 101 is electrically connected to a connection node of semiconductor switching means 109, 110 of the inverter 102 and another terminal of the power coil 101 is electrically connected to a connection node of the capacitors 104, 105.

It goes without saying that the inverter and oscillator circuit topology shown is only an example. In the context of the present invention, for example, an inverter with a full bridge can be used, and series or parallel oscillator circuits interconnected in other ways can be used, etc.

An alternating magnetic field is generated by means of the power coil 101 to transmit the energy.

The device 100 also has a communication device 111 which is coupled to a communication coil 112. The communication device 111 in conjunction with the communication coil 112 is used for bidirectional data exchange with the electrical consumer 200.

The device 100 also has a regulator 116 which is designed to regulate a power output by the inverter 102 to a predetermined setpoint, wherein a frequency and/or a duty cycle of the activation signal A_S is/are used as the manipulated variable.

The electrical consumer 200 has a power coil 201 and a downstream passive LC resonant circuit 202.

The electrical consumer 200 also has a switching device 203 for changing a load impedance of the electrical consumer 200. The elements 204 and 205 are shown as examples of loads that can be switched on or off.

FIG. 2 shows a highly schematic circuit diagram of the switching device 203 and its surrounding devices. The switching device 203 has switching means 211, 212, 213 and 214, which are activated by a logic unit 215 for changing the load impedance. The switching means 211 and 212 switch resistive loads 204a or 204b, which are supplied directly with a high-frequency voltage from the LC resonant circuit 202. The switching means 213 switches an inductive load 205b and the switching means 214 switches an electric motor 205a. An optional rectifier 209 with a downstream capacitor 210 rectifies the high-frequency output voltage of the LC resonant circuit 202, wherein the voltage thus rectified is used to supply the electric motor 205a and the inductive load 205b.

The electrical consumer 200 also has a communication device 206 which is coupled to a communication coil 207. The communication device 206 in conjunction with the communication coil 207 is used for bidirectional data exchange with the device 100.

The electrical consumer 200 also has a control device 208 that controls the operation of the electrical consumer 200. The control device 208 has a data connection to the switching device 203 and the communication device 206. The control device 208 controls, among other things, the synchronized changing of the load impedance by suitable activation of the switching device 203 and communication with the device 100.

According to the invention, the operation of the device 100 and the operation of the electrical consumer 200 are synchronized in such a way that, during a change in the load impedance of the electrical consumer 200, a transition frequency and/or a transition duty cycle of the pulse-width-modulated activation signal A_S is/are set in such a way that a voltage U_1 generated or induced in the electrical consumer 200 does not exceed a specified threshold value of 600 V.

The system operation according to the invention is described in detail below with reference to FIG. 3.

FIG. 3 firstly shows a temporal waveform, labeled as "A", of the supply voltage U_S as a sequence of rectified line half-waves. FIG. 3 also shows a temporal waveform of the load impedance, labeled as "B". FIG. 3 also shows an RMS value of the load voltage U_1, labeled as "C". Finally, FIG. 3 shows a temporal waveform, labeled as "D", of the setpoint of the regulator 116, which describes the power to be output by the inverter 102.

During the first three line half-waves, the power setpoint during power transmission time intervals LZI is 1500 Watt. An RMS value of the load voltage U_1 of 230 V is obtained. If necessary, data transmission takes place during data transmission time intervals DZI around a zero crossing of the line voltage U_N.

At time t1, the electrical consumer 200 sends data to the device 100, wherein the data indicate that electrical consumer 200 plans to change its electrical load impedance.

At time t2, the device 100 sends data to the electrical consumer 200, wherein the data indicates that the data from the electrical consumer 200 has been received by the device 100 and the device 100 will support the change in load impedance as intended.

After a line half-wave at time t3, the device 100 deactivates its regulator 116 and adjusts a transition frequency and/or a transition duty cycle in such a way that the RMS value of the voltage U_1 is always less than a threshold of 230 V, irrespective of the load impedance.

At time t4, the electrical consumer 200 changes its load impedance.

At time t5, the electrical consumer 200 transmits data to the device 100, wherein the data indicates that the electrical consumer 200 has changed its load impedance.

From a time t6, the device 100 activates its regulator 116 based on a power setpoint of 50 Watt, which completes the load-impedance change.

The invention claimed is:

1. A method for operating a system having an electrical consumer (200) and a device (100) for wireless transmission of energy to the electrical consumer (200) by means of inductive coupling, wherein the device (100) has:
a rectifier (108) for generating a DC voltage (U_S) from a line voltage (U_N),
an inverter (102) which is fed from the DC voltage (U_S) and designed to generate a pulse-width-modulated activation signal (A_S), a power coil (101) activated by the pulse-width-modulated activation signal (A_S), by means of which an alternating magnetic field can be generated to transmit the energy, a communication device (111) designed to communicate bi-directionally with the electrical consumer (200), and a regulator (116) designed to regulate a power output by the inverter (102) to a predetermined setpoint, and wherein the electrical consumer (200) has:
   a switching device (203) for changing a load impedance of the electrical consumer (200), and
   a communication device (206) designed to communicate bi-directionally with the device (100), wherein the method comprises:
   transmitting first data from the electrical consumer (200) to the device (100), wherein the first data indicates that the electrical consumer (200) plans to change its electrical load impedance,
   thereafter, transmitting second data from the device (100) to the electrical consumer (100), wherein the second data indicates that the first data of the electrical consumer (200) has been received by the device (100), and adjusting a transition frequency and/or a transition duty cycle,
   thereafter, changing the load impedance of the electrical consumer (200) and transmitting third data from the electrical consumer (200) to the device (100), wherein the third data indicates that the electrical consumer (200) has changed its load impedance,
   thereafter, regulating an electrical power output by the inverter (102) to a stationary setpoint, and
   synchronizing the operation of the device (100) and the operation of the electrical consumer (200) in such a way that, during a change in the load impedance of the electrical consumer (200), the adjusting of the transition frequency and/or the transition duty cycle of the pulse-width-modulated activation signal (A_S) occurs in such a way that a voltage (U_1) and/or current induced in the electrical consumer (200) do not exceed and/or fall below specified threshold values.

2. The method as claimed in claim 1, characterized in that the regulator (116) is disabled while the load impedance of the electrical consumer (200) is changed.

3. The method as claimed in claim 1, characterized in that the transition frequency and/or the transition duty cycle is/are set in such a way that the voltage U_1 induced in the electrical consumer (200) remains less than or equal to a nominal voltage of the electrical consumer (200), irrespective of the load impedance of the electrical consumer (200).

4. The method as claimed in claim 1, characterized in that
for coupling factors between the device (100) and the electrical consumer (200) of ≤0.45, the transition frequency is set to ≥ 40 kHz, and
for coupling factors between the device (100) and the electrical consumer (200) of ≥0.45, the transition frequency is set to ≥ 50 KHz.

5. The method as claimed in claim 1, characterized in that the transition frequency is zero Hz.

6. The method as claimed in claim 1, characterized in that the first data transmitted from the electrical consumer (200) to the device (100) additionally includes a desired setpoint, wherein the stationary setpoint is set depending on the desired setpoint.

7. The method as claimed in claim 1, characterized in that the first data transmitted from the electrical consumer (200) to the device (100) includes additional information identifying a future load impedance.

8. The method as claimed in claim 1, characterized in that one or more of: i) the first data, ii) the second data, or (iii) the third data is/are transmitted between the electrical consumer (200) and the device (100) in a time range associated with a zero crossing of the line voltage.

9. A system (1), comprising
a device (100) for wireless transmission of energy to an electrical consumer (200) by means of inductive coupling, and
the electrical consumer (200),
wherein the device (100) has:
   a rectifier (108) for generating a DC voltage (U_S) from a line voltage (U_N),
   an inverter (102) which is fed from the DC voltage (U_S) and designed to generate a pulse-width-modulated activation signal (A_S),
   a power coil (101) activated by the pulse-width-modulated activation signal (A_S), by means of which an alternating magnetic field can be generated to transmit the energy,
   a communication device (111) designed to communicate bi-directionally with the electrical consumer (200), and
   a regulator (116) designed to regulate a power output by the inverter (102) to a predetermined setpoint, and
wherein the electrical consumer (200) has:
   a switching device (203) for changing a load impedance of the electrical consumer (200) and
   a communication device (206) designed to communicate bi-directionally with the device (100), and
wherein the device (100) and the electrical consumer are designed to carry out a method as claimed in claim 1.

* * * * *